Sept. 22, 1959 W. KOHLHAGEN 2,905,839
COMMUTATOR-TYPE ELECTRIC MOTOR OF REGULATED OUTPUT TORQUE
Filed May 2, 1957 2 Sheets-Sheet 1
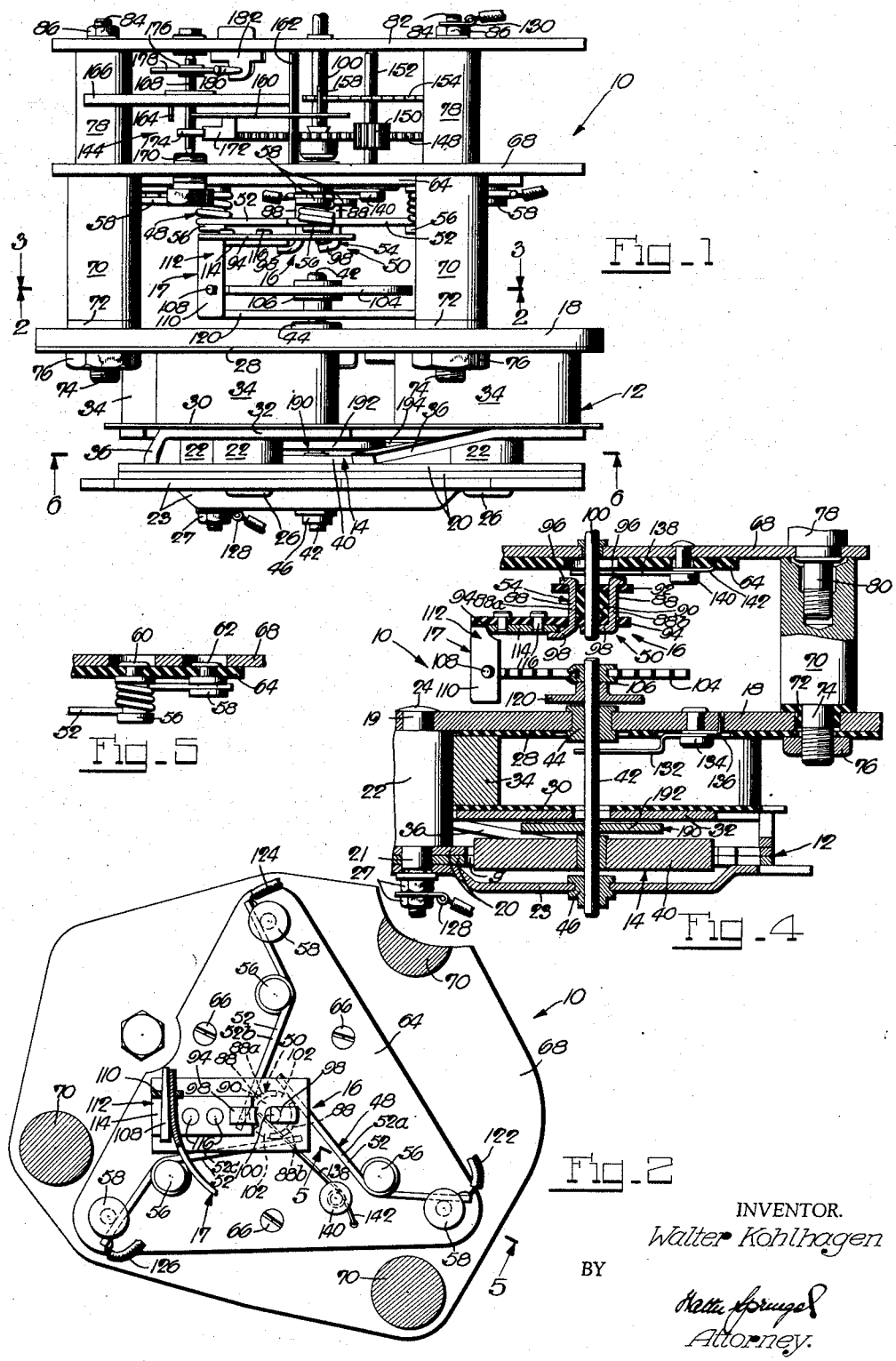
INVENTOR.
Walter Kohlhagen
BY
Attorney.

Sept. 22, 1959
W. KOHLHAGEN
2,905,839
COMMUTATOR-TYPE ELECTRIC MOTOR OF REGULATED OUTPUT TORQUE
Filed May 2, 1957
2 Sheets-Sheet 2
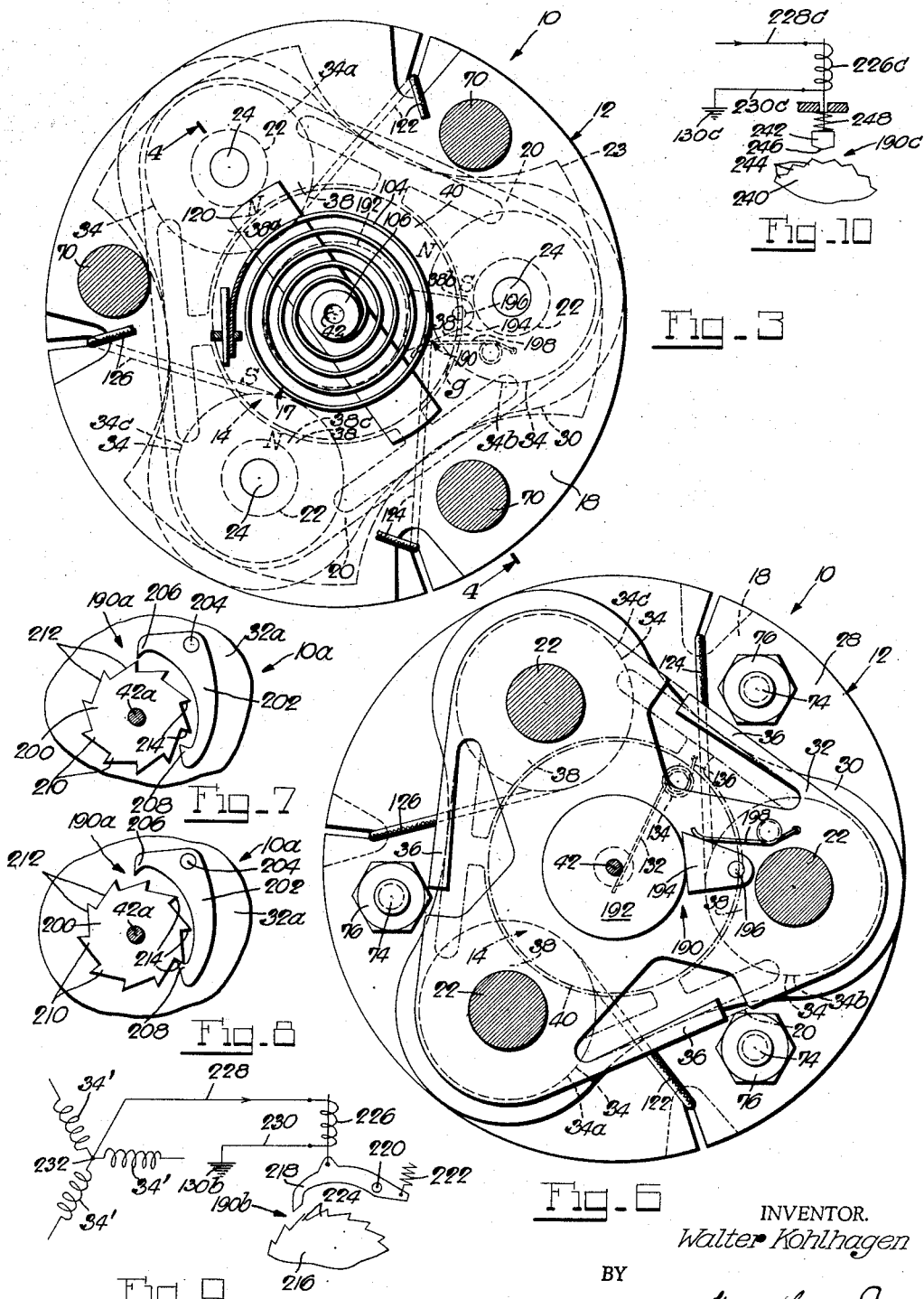
INVENTOR.
Walter Kohlhagen
BY
Attorney.

United States Patent Office 2,905,839
Patented Sept. 22, 1959

2,905,839

COMMUTATOR-TYPE ELECTRIC MOTOR OF REGULATED OUTPUT TORQUE

Walter Kohlhagen, Elgin, Ill., assignor to The E. Ingraham Company, Bristol, Conn., a corporation of Connecticut Application May 2, 1957, Serial No. 656,567

6 Claims. (Cl. 310—40)

This invention relates to commutator-type electric motors of regulated output torque.

The motor to which the present invention generally pertains is of the type disclosed in the patent to Putnocky, No. 2,624,017, dated December 30, 1952. This motor features a rotor unit comprising a rotor and the rotary unit of a commutation device, in this case the commutator, of which the latter and the rotor are separated from each other and drivingly connected by a preloaded coupling spring which compels the commutator to turn in the same direction as the rotor. The commutator in this prior motor is under the control of an escapement so that the magnetic field in the field structure, and hence also the rotor, will advance rotatively in intermittent steps between rest periods which are also under the control of the escapement. Either the rotor or the commutator may be used as the output element of the motor. If the rotor is used as the output element, the full magnetic motor torque is available for utility purposes and the rotor will step after equal time intervals under the control of the escapement. If the commutator is used as the output element, the output torque is furnished by the preloaded coupling spring and, hence, may be considerably smaller in magnitude than the magnetic torque in the motor, and the commutator will also turn at a rate controlled by the escapement. There is also provided in this prior motor a lost-motion connection between the rotor and commutator which permits relative rotation between the latter through a limited range within part of which the rotor may turn in phase with the magnetic field in the field structure, and to one end of which the coupling spring will, on interruption of the current, urge the commutator and rotor so that the latter will continue in the same phase relation with the magnetic field on reapplication of the current.

While this prior motor, as well as the motor of the same general type disclosed in my copending application Serial No. 656,280, now Patent No. 2,897,381, filed May 1, 1957, are generally satisfactory, they leave much to be desired with respect to their reliability of performance under conditions which may and do occur in many practical applications of these motors. Thus, it is quite possible that dirt, lubricant, burned contacts, ice formation, condensation and other adverse conditions may lead to sudden interruption of the current path through the motor at a commutator segment or segments and a contacting brush or brushes of the commutation device. If a sudden interruption of the current path through either of these motors occurs from any one or more of these causes, the preloaded coupling spring will immediately back the rotor to the end of its lost-motion connection with the rotary unit of the commutation device, with the result that the rotary commutation unit and, hence, the motor itself, will come to an immediate stop and remain stopped until the cause of the current break is removed.

It is the primary aim and object of the present invention to make provisions in a motor of this type whereby stoppage of the same from any one or more of the aforementioned causes is to most practical intents and purposes eliminated, so that the reliability of the motor in its operation is greatly enhanced and its field of practical applications broadened accordingly.

It is also among the objects of the present invention largely to eliminate stoppage of a motor of this type from any one or more of the aforementioned causes by a structurally exceedingly simple expediency which neither complicates the assembly of the motor, nor adds appreciably to the cost of the motor.

It is another object of the present invention to provide a motor of this type in which in the event of current interruption from any cause whatsoever, the rotor is prevented from backing at all, or only slightly, with the result that the rotary commutation unit will continue to be driven by the preloaded coupling spring. If the current is suddenly interrupted from any one or more of the aforementioned causes, the continued drive of the rotary commutation unit by the couping spring, with or without benefit from the self-cleaning action of the commutator segments and contacting brushes, will in almost all cases, save hopeless deterioration of a commutator segment or brush, overcome the cause of the current interruption and reapply the current before the rotary commutation unit reaches the end of its lost-motion connection with the rotor, with the result that the motor will continue its reliable performance without interruption. On the other hand, if the current is intentionally interrupted, the rotary commutation unit will be driven by the coupling spring to the end of its lost-motion connection with the rotor from which the latter will step into phase relation with the magnetic field in the field structure on reapplying the current.

It is a further object of the present invention to provide in a motor of this type a one-way device which permits rotation of the rotor in phase relation with the magnetic field in the field structure, and prevents any appreciable backup of the rotor in the opposite direction toward the end of its lost-motion connection with the rotary commutation device under the urgency of the coupling spring on current interruption from any cause whatsoever, as aforementioned.

Another object of the present invention is to provide in a motor of this type the aforementioned one-way device of which the companion members are preferably in the form of a simple disc or ratchet wheel on the rotor and a cooperating pawl on a fixed part of the motor.

Other objects and advantages will appear to those skilled in the art from the following, considered in conjunction with the accompanying drawings.

In the accompanying drawings, in which certain modes of carrying out the present invention are shown for illustrative purposes:

Fig. 1 is an elevational view of a motor embodying the present invention;

Figs. 2 and 3 are cross sections through the motor substantially as taken on the lines 2—2 and 3—3, respectively, of Fig. 1;

Fig. 4 is a fragmentary longitudinal section through the motor substantially as taken on the line 4—4 of Fig. 3;

Fig. 5 is a fragmentary section through the motor substantially as taken on the line 5—5 of Fig. 2;

Fig. 6 is a cross section through the motor taken on the line 6—6 of Fig. 1;

Figs. 7 and 8 are fragmentary views of a motor embodying the present invention in a modified manner; and Figs. 9 and 10 are diagrammatic views illustrating further modified forms, respectively, of the present invention in its application to a motor.

Referring to the drawings, and more particularly to

Figs. 1 to 6 thereof, the reference numeral 10 designates a motor which has as its major components a field structure 12, a rotor structure 14, a commutation device 16, and a driving connection 17 between the rotor structure and the commutation device. The field structure 12 comprises a field plate 18, one or more pole plates 20, and equiangularly spaced ferromagnetic cores 22, presently three, which are interposed between the plates 18 and 20 and hold the latter in spaced parallel relation. To this end, shanks 19 on adjacent ends of the cores 22 are conveniently riveted to the field plate 18 as at 24 (Figs. 3 and 4), while their opposite end shanks 21 extend through the pole plates 20 and a superposed nonmagnetic end plate 23 and are secured to the latter. Thus, the end shanks 21 of two of the cores 22 are conveniently riveted over the end plate 23 as at 26 (Fig. 1), while the end shank 21 of the remaining core 22 is, for a reason hereinafter described, preferably threaded and receives a nut or nuts 27 for its attachment to the end plate 23. Surrounding the cores 22 and interposed between the field plate 18 and a retainer plate 32, preferably through intermediation of insulation pieces 28 and 30, respectively, are field coils 34. The plate 32 firmly holds the field coils 34 against the field plate 18, plate 32 having to this end punched-out prongs 36 which are bent out of the plane of the latter and rest against the nearest pole plate 20 (Figs. 1, 4 and 6). The plates 20 are provided with punched-out field poles 38 which are associated with the field coils 34 (Fig. 3).

The rotor structure 14 comprises a rotor 40 on a shaft 42 which, as shown in Fig. 4, is journalled in suitable bearings 44 and 46 in the field plate 18 and end plate 23, respectively, so as to maintain an air gap $g$ of uniform width between the periphery of the rotor 40 and the field poles 38 (Fig. 3). The rotor 40 is, in this instance, a permanent-magnet disc having two opposite N and S poles (Fig. 3).

The commutation device 16 comprises a fixed unit 48 and a rotary unit 50, of which the fixed unit is, in the present example, a set of brushes 52, while the rotary unit is a commutator 54. The brushes 52, of which there are presently three due to their direct connection with the field coils 34, respectively, as described hereinafter, are in this instance in the form of simple conductive wire-type torsion springs which are anchored on posts 56 (Figs. 1, 2 and 5) and urged into engagement with the commutator 54 by being backed with their outer ends against further posts 58. The posts 56 and 58 are suitably mounted, and preferably riveted as at 60 and 62, to an insulation plate 64 (Figs. 2 and 5) which, in turn, is screwed at 66 to a plate 68 that is electrically conductive for reasons hereinafter explained wherefore the brushes 52 are insulatingly carried by the conductive plate 68 through intermediation of the insulation plate 64. The conductive plate 68 is, in turn, carried by the field plate 18 in electrically insulated and spaced relation therewith through intermediation of pillars 70. To this end, the lower ends of the pillars 70 rest on flanged insulating bushings 72 in the field plate 18 (Figs. 1 and 4), and their reduced shanks 74 thereat project through these bushings and receive nuts 76 which bear against the insulation piece 28 on the field plate 18. The plate 68 rests on top of the pillars 70 and is held thereon by additional pillars 78 the reduced bottom shanks 80 of which are threadedly received in the respective pillars 70 (Fig. 4). The pillars 78 serve to support another plate 82 on the plate 68 in spaced relation therewith (Fig. 1). To this end, the reduced top shanks 84 on the pillars 78 extend through the plate 82 and receive nuts 86.

The commutator 54 comprises conductive segment elements 88, presently two in view of the exemplary provision of three brushes 52. The commutator 54 further comprises an insulating core 90 and opposite insulating end pieces 92 and 94 through which extend end prongs 96 and 98, respectively, of the segment elements 88 that are bent over in the fashion shown in Fig. 4 for the assembly of the commutator parts 88, 90, 92 and 94 into a self-contained unit which is firmly mounted on a shaft 100, journalled in the plates 68 and 82. The segment elements 88 are equiangularly spaced from each other, and are of such peripheral extent that at least two of the brushes 52 will in any angular position of the commutator engage the segment elements 88a and 88b, respectively. The commutator segments 88 are received in longitudinal recesses in the insulating core 90 so that segmental portions 102 of the latter extend between the conductive segment elements 88 and are peripherally flush therewith (Fig. 2).

The driving connection 17 between the rotor structure 14 and the commutation device 16 comprises a coupling spring 104 and anchor connections of its ends with the rotor shaft 42 and the rotary unit of the commutation device, presently the commutator 54. To this end, the coupling spring 104, which is preferably of spiral coiled type, is with its inner end secured, presently in the conventional manner (Fig. 4) of a hairspring movement, to a collet 106 on the rotor shaft 42, while the outer end of the coupling spring is anchored by a wedge 108 in a leg 110 of an L-shaped bracket 112 which with its other leg 114 is secured, by rivets 116, for instance, to the insulating arm or end piece 94 of the commutator 54.

Since the commutator-carrying shaft 100 is presently the output or load shaft of the motor and is to receive torque from the coupling spring 104, and since the required torque output in this case greatly exceeds the torque imparted to the shaft 100 solely by virtue of the stepping of the rotor structure 14 in phase with the rotating magnetic field in the field structure 12, it follows that the spring 104 must be prewound to an extent near which it will impart the required torque to the shaft 100 when the motor runs, and must remain so prewound when the motor stops as the spring would otherwise unwind and the motor become inoperative. To this end, there is provided between the rotor structure 14 and the rotary unit of the commutation device 16 a lost-motion connection which presently is in the form of a phase arm 120 on the rotor shaft 42 and cooperates with the leg 110 of the bracket 112 on the arm 94 of the commutator 54 in a manner more fully explained hereinafter.

The field coils 34 may be connected in Y or Δ fashion, and in this case may be considered to be connected in Y fashion, with their one ends connected with each other (not shown). The other ends of the field coils 34a, 34b and 34c are connected with the brushes 52a, 52b and 52c, respectively, through leads 122, 124 and 126, respectively (Figs. 2, 3 and 6). Since the rotor 40 is, in the present instance, of permanent-magnet type, the current required for operating the motor is D.C. The current path through the motor is in the present example the same as that featured in my aforementioned copending application Serial No. 656,280 now Patent No. 2,897,381. Thus, for its connection with the current source, the motor is provided with terminals 128 and 130 either one of which may be the positive terminal and the other one the negative terminal. Assuming now that the terminal 128 is the positive terminal (Fig. 4), the current flow through the motor in the exemplary relative angular position of the fixed and rotary units of the commutation device 16 (Fig. 2) is via the terminal 128, the associated core 22, stator plate 18, bearing 44, rotor shaft 42, collet 106, coupling spring 104, L bracket 112 and commutator segment 88a which by its bent-over lug 98 is electrically connected with the bracket 112 (Fig. 4), thence brush 52b (Fig. 2), conductor 124, the connected field coils 34b and 34c (Fig. 3), conductor 126, brush 52c (Fig. 2), commutator segment 88b, output shaft 100 (Fig. 4) by virtue of its pressfitted reception of the bent-over lug 98 of the commutator segment 88b, plate 86 and pillar 78 to the terminal 130 (Fig. 1). To assure a permanent and reliable electrical connection between the rotor shaft 42 and the fixed field plate 18, there is additionally provided a wiping contact in the form of a wire-type torsion spring 132 (Figs. 4 and 6) which is in contact with the rotor shaft 42, and is anchored on a post 134 in electrically conductive relation with the field plate 18 and kept loaded by having its end 136 locked to the latter. To assure a like permanent and reliable electrical connection between the rotary output shaft 100 and the fixed plate 68, there is additionally provided a wiping contact in the form of a wire-type torsion spring 138 (Figs. 2 and 4) which is in contact with the output shaft 100, and is anchored on a post 140 in electrically conductive relation with the plate 68 and kept loaded by having its end 142 locked to the insulation plate 64.

When the motor is running, the coupling spring 104 will remain wound beyond its prewind extent and will, between rewinds by the stepping rotor structure 14, partially unwind at a rate depending on the load on or permissible escape rate of the shaft 100. In the present example, the running rate of the output shaft 100 is under the control of an escapement 144 (Fig. 1), and the output shaft may, as a further example, serve as the driver of a movement in the manner disclosed in my aforementioned copending application Serial No. 656,280, now Patent No. 2,897,381. To this end, the output shaft 100 carries a gear 148 which is in permanent mesh with a pinion 150 on a staff 152 which is suitably journalled in the plates 68 and 82 and carries an escape wheel 154. Cooperating with the teeth of the escape wheel 154 in conventional manner are the pallet pins 158 on one end of an escape lever 160 on a staff 162 which is suitably journalled in the plates 68 and 82. Cooperating with the other end of the escape lever 160 in conventional manner are impulse pins 164 on a balance wheel 166 on a staff 168 which is journalled in the plate 82 and in a suitable bearing 170 in the plate 68. The escape lever 160 is also provided with a guard 172 which cooperates in conventional manner with a roller 174 on the staff 168. Secured to a collet 176 on the staff 168 is the inner end of a hairspring 178, the outer end of which is secured by a wedge pin 180 to an anchor piece 182 on the plate 82. The escapement 144 just described thus permits the output shaft 100 to turn or escape at a uniform time rate.

Let it now be assumed that the motor is running in the correct direction for the drive of the aforementioned exemplary movement by the output shaft 100, i.e., counterclockwise for the commutator 54 in Fig. 2 and clockwise for the rotor 40 in Fig. 3 due to the different directions in which the sections of these Figs. are taken, and let it be further assumed that the commutator 54 is in the momentary angular position shown in Fig. 2 in which the commutator segment 88b is just short of engagement with the brush 52a and is still in engagement with the brush 52c. Under these circumstances, current will pass from the previously assumed "hot" commutator segment 88a (Fig. 2) through the brush 52b, the conductor 124, the field coil 34b (Fig. 3), thence the connected field coil 34c, conductor 126, brush 52c (Fig. 2) and the other commutator segment 88b with its previously described ground connection, with the result that the field poles 38b and 38c will be of opposite polarity, in this instance S and N, respectively, as indicated in Fig. 3. Hence, the permanent-magnet rotor 40 will assume the position of minimum reluctance shown in Fig. 3 and will remain in this position for the short interval before the segment 88b of the commutator 54 on the escapement-controlled output shaft 100 comes into contact with the brush 52a, the coupling spring 104 meanwhile unwinding at its outer end clockwise as viewed in Fig. 3 and turning the commutator 54 on the output shaft 100 counterclockwise as viewed in Fig. 2 at the rate permitted by the escapement 144. The coupling spring 104 thus unwinds to the lower limit of its rewind range when on the counterclockwise drive of the commutator 54 (Fig. 2) the segment 88b thereof moves into contact with the brush 52a, the segment 88b moving shortly thereafter out of contact with the brush 52c. As soon as the commutator segment 88b moves into contact with the brush 52a, the field pole 38a (Fig. 3) becomes polarized, N in this instance, while the other field poles remain polarized as indicated, though the field pole 38c will remain thus polarized for only a brief interval thereafter, with the result that the rotor 40 swings clockwise as viewed in Fig. 3 and begins to rewind the spring 104, not stopping until after the commutator segment 88b has moved out of contact with the brush 52c and the rotor has moved into its new position of minimum reluctance in the magnetic field in the field structure 12 which in the present example is 60 degrees clockwise from its indicated position of minimum reluctance in Fig. 3. On reaching its new position of minimum reluctance, the rotor 40 has rewound the coupling spring 104 to the upper limit of its rewind range, and the same will again unwind to the lower limit of its rewind range and drive the output shaft 100 under the control of the escapement by the time the next commutation change in the field coils occurs and renewed rewinding of the spring takes place, as will be readily understood. The rotor 40 thus advances in intermittent steps of 60 degrees in this example and periodically rewinds the spring 104 while the latter keeps up its continuous drive of the output shaft at a torque which, while fluctuating slightly due to the periodic rewind of the spring, is to all intents and purposes constant for many practical applications, including the drive of the aforementioned exemplary movement.

Were it not for the provision of a one-way device 190 in accordance with the present invention (Fig. 6), the loaded coupling spring 104 would, on interruption of the current, immediately turn the rotor 40, in this instance, backwards or counterclockwise as viewed in Fig. 3 until the phase arm 120 backs against the leg 110 of the L bracket 112 on the commutator 54. The one-way device 190 functions to prevent the spring-urged back-up of the rotor 40 from any position of minimum reluctance in the magnetic field when the current is interrupted from any cause whatsoever, with ensuing important advantages explained hereinafter. The one-way device 190 comprises, in the present example, a disc 192 on the rotor shaft 42 and a cooperating friction-type pawl 194 which is pivotally mounted at 196 on the retainer plate 32 (Fig. 6) and normally urged against the periphery of the disc 192 by a suitably anchored spring 198. Thus, the pawl 194 permits rotation of the rotor structure 14 in its normal drive direction, i.e. counterclockwise as viewed in Fig. 6 and clockwise as viewed in Fig. 3, but will immediately self-lock against the periphery of the disc 192 and arrest the rotor structure 14 against rotation in the opposite or back-up direction on the slightest tendency of the same to turn in the latter direction. Hence, if any one or more of a number of quite likely causes, such as dirt particles, ice formation, lubricant deposit, condensation or burned contact spots, for instance, at a commutator segment or segments and a contacting brush or brushes, will lead to sudden interruption of the current through the motor, the rotor is prevented from backing up, with the result that the coupling spring 104 will continue the correct drive of the commutator 54 and output shaft 100 under the control of the escapement 144, and the ensuing rotation of the commutator relative to the contacting brushes despite the current interruption will in most cases overcome, if not completely remove, the cause of the current interruption and reapply the current long before the commutator advances to the end of its lost-motion connection with the rotor structure. Thus, in case of current interruption in the running motor from any one or more of the aforementioned and other causes, the current interruption will in almost all cases, save hopeless deterioration of a commutator segment or brush, be only temporary and not affect proper running of the motor. For example, the present motor will continue to run indefinitely if a bad spot or spots on a commutator segment or brush, or both, will momentarily, and even periodically, interrupt the current flow through the motor, whereas under the same conditions the prior motors of this type will immediately and inevitably stop and remain stopped. Also, if the current should momentarily or intermittently be interrupted, as happens so often in defective circuits or during switching from one circuit to another, the present motor will continue its operation uninterruptedly, while the prior motors of this type will inevitably stop and remain stopped until the current returns. This greatly enhances the reliability of the motor in its operation under likely and even unavoidable adverse conditions, and thus opens many new fields for the use of the present motor in which the prior motors of this type could not be used for lack of reliability in operation under these same adverse conditions.

On stopping the motor by intentionally interrupting the current, the rotary commutation unit, in this example the commutator 54, will by the coupling spring 104 be driven to the end of its lost-motion connection with the rotor structure 14, i.e., the commutator 54 will be advanced in its normal drive direction until the arm 110 of the bracket 112 thereon comes into stopping engagement with the phase arm 120 (Fig. 3). When this occurs, the wind of the coupling spring 104 is reduced to its prewind extent. Of course, it will be appreciated that the spring-urged advance of the commutator 54 with its bracket 112 into stopping engagement with the phase arm 120 on stopping the motor must necessarily be limited so that the rotor 40 will step into phase relation with the magnetic field in the field structure 12 when the motor is restarted on reapplication of the current thereto. Thus, assuming that the motor is stopped with the rotor 40 remaining in the position shown in Fig. 3, i.e., in its position of minimum reluctance in the magnetic field across the field poles 38b and 38c as described, it follows from Figs. 2 and 3 that the ensuing spring-urged advance of the commutator 54 with its bracket 112 into stopping engagement with the phase arm 120 will leave the commutator in an advance position in which, on reapplication of the current, this time via the brushes 52a and 52b, the magnetic field will extend across the field poles 38a and 38b, and the rotor 40 will immediately step into phase with this magnetic field in normal clockwise direction as viewed in Fig. 3 and immediately release the commutator for its spring drive under the control of the escapement 144.

Figs. 7 and 8 show a modified one-way device 190a embodied in a motor 10a which may otherwise be exactly like the described motor 10. This device comprises a ratchet wheel 200 which may be carried by the rotor shaft 42a in the same position as the disc 192 of the described one-way device 190 on the rotor shaft 42 in Figs. 4 and 6. Cooperating with the ratchet wheel 200 is a pawl 202 which is pivotally mounted at 204 on the coil-retainer plate 32a, and has in this instance two acting ends 206 and 208 which alternately cooperate with the teeth 210 of the ratchet wheel 200. Thus, it follows that the inclined flanks 212 of the ratchet teeth 210 will alternately cam the ends 206 and 208 of the pawl 202 out of the way when the rotor and its shaft 42a are driven in the correct direction, i.e., counterclockwise as viewed in Figs. 7 and 8, but the stop flank 214 of the ratchet tooth 212 nearest either pawl end 206 or 208 will become locked with the latter when the ratchet wheel 200 and the rotor of the motor are slightly spring-backed in the opposite direction (Fig. 8) on interruption of the motor current either intentionally or from any other cause whatsoever.

Fig. 9 illustrates in a diagrammatic manner another modified one-way device 190b embodied in a motor of the same type. This device comprises a ratchet wheel 216 on the rotor shaft and a cooperating pawl 218 which is pivotally mounted at 220 on the field structure, and normally urged by a spring 222 against the ratchet wheel to lock with a tooth 224 thereof when the rotor and, hence, the ratchet wheel are, on interruption of the motor current, spring-backed in a direction opposite to the normal drive direction of the rotor. The present one-way device 190b further comprises a relay 226 which through leads 228 and 230 is connected with the junction 232 of the presently Y connected field coils 34' and with the exemplary negative motor terminal 130b, respectively, wherefore the relay 226 is energized with either one of the field coils 34' and, hence, holds the pawl 218 out of engagement with the ratchet wheel 216, as shown, when the motor runs. However, on current interruption in the motor, whether intentional or from any other cause, the relay 226 will be deenergized, whereupon the pawl 218 will immediately be spring-urged into engagement with the ratchet wheel and stop the latter and the associated rotor from being spring-backed in a direction opposite to the normal drive direction of the latter.

Fig. 10 diagrammatically illustrates still another modified device 190c which functions similarly as the device 190b of Fig. 9, except that the present device locks the rotor against rotation in either direction on current interruption in the motor. The present device 190c comprises a disc 240 on the rotor shaft and a cooperating plunger 242 which is slidably mounted on the field structure. The disc 240 is provided with peripheral saw teeth 244 and the active end 246 of the plunger 242 is formed to interlock with a saw tooth on the disc 240 and prevent rotation of the latter and associated rotor in either direction when a spring 248 urges the plunger 242 into engagement with the disc 240 on interruption of the current in the motor and ensuing deenergization of the relay 226c. The relay 226c may through leads 228c and 230c be connected with the junction of exemplary Y connected field coils (not shown) and with the exemplary negative motor terminal 130c, respectively, so that the relay 226c will be energized with either field coil to hold the plunger 242 out of engagement with the disc 240, as shown.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a motor, the combination with a field structure, a rotor structure, and coils carried by one of said structures, of a commutation device operative on current flow therethrough sequentially to energize said coils to produce in said one structure a rotary magnetic field for driving said rotor structure in phase therewith, said device including rotary and fixed units of which one unit is a commutator with conductive segments and the other unit is a set of brushes; preloaded spring means interposed and forming the sole driving connection between said rotor structure and rotary unit and urging the latter in the drive direction of the former; a device operative to permit rotation of said rotor structure in said drive direction and substantially prevent rotation of the same in the opposite direction on current flow interruption through said commutation device; and means providing for relative rotation between said rotary unit and rotor structure through a limited range within part of which the latter may turn with the magnetic field, and to one end of which said spring means will, on said current flow interruption, urge said rotary unit so that said rotor structure will step into phase relation with the magnetic field on reestablishment of current flow through said commutation device.

2. In a motor, the combination with a field structure, a rotor structure, and coils carried by one of said structures, of a commutation device operative on current flow therethrough sequentially to energize said coils to produce in said one structure a rotary magnetic field for driving said rotor structure in phase therewith, said device including rotary and fixed units of which one unit is a commutator with conductive segments and the other unit is a set of brushes; preloaded spring means interposed and forming the sole driving connection between said rotor structure and rotary unit and urging the latter in the drive direction of the former; a one-way device having first and second parts turning with said rotor structure and carried by said field structure, respectively, and being operative to permit rotation of said rotor structure in said drive direction and substantially prevent rotation of the same in the opposite direction; and means providing for relative rotation between said rotary unit and rotor structure through a limited range within part of which the latter may turn with the magnetic field, and to one end of which said spring means will, on current flow interruption through said commutation device, urge said rotary unit so that said rotor structure will step into phase relation with the magnetic field on reestablishment of current flow through said commutation device.

3. The combination in a motor as set forth in claim 2, in which said first and second parts of said one-way device are a disc and a pivoted friction pawl, respectively, of which the latter is normally urged against the periphery of the latter and is self-locking therewith when said rotor structure tends to turn in said opposite direction.

4. The combination in a motor as set forth in claim 2, in which said first and second parts of said one-way device are a ratchet wheel with teeth and a cooperating pawl, respectively, so coordinated that the latter will override said ratchet teeth on rotation of said rotor structure in said drive direction, but will lock with the nearest ratchet tooth on rotation of said rotor structure opposite to said drive direction.

5. In a motor, the combination with a field structure, a rotor structure, and coils carried by one of said structures, of a commutation device operative on current flow therethrough sequentially to energize said coils to produce in said one structure a rotary magnetic field for driving said rotor structure in phase therewith, said device including rotary and fixed units of which one unit is a commutator with conductive segments and the other unit is a set of brushes; preloaded spring means interposed and forming the sole driving connection between said rotor structure and rotary unit and urging the latter in the drive direction of the former; a device having parts turning with said rotor structure and carried by said field structure, respectively, of which one part is normally urged against the other part for stopping said rotor structure; an electromagnetic device connected with said coils so as to be energized with either coil and adapted, when energized, to hold said one part disengaged from the other part; and means providing for relative rotation between said rotary unit and rotor structure through a limited range within part of which the latter may turn with the magnetic field, and to one end of which said spring means will, on current flow interruption through said commutation device, urge said rotary unit so that said rotor structure will step into phase relation with the magnetic field on reestablishment of current flow through said commutation device.

6. In a motor, the combination with a field structure, a rotor structure, and coils carried by one of said structures, of a commutation device operative on current flow therethrough sequentially to energize said coils to produce in said one structure a rotary magnetic field for driving said rotor structure in phase therewith, said device including rotary and fixed units of which one unit is a commutator with conductive segments and the other unit is a set of brushes; preloaded spring means interposed and forming the sole driving connection between said rotor structure and rotary unit and urging the latter in the drive direction of the former; a one-way device having parts turning with said rotor structure and carried by said field structure, respectively, of which one part is normally urged into cooperative engagement with the other part in which to permit rotation of said rotor structure in said drive direction and substantially prevent rotation of the same in the opposite direction; and an electromagnetic device connected with said coils so as to be energized with either coil and adapted, when energized, to hold said one part out of cooperative engagement with the other part; and means providing for relative rotation between said rotary unit and rotor structure through a limited range within part of which the latter may turn with the magnetic field, and to one end of which said spring means will, on current flow interruption through said commutation device, urge said rotary unit so that said rotor structure will step into phase relation with the magnetic field on reestablishment of current flow through said commutation device.

References Cited in the file of this patent

UNITED STATES PATENTS

| | | |
|---|---|---|
| 1,898,753 | Wente | Feb. 21, 1933 |
| 2,539,836 | Hoffman | Jan. 30, 1951 |
| 2,624,017 | Putnocky | Dec. 30, 1952 |
| 2,722,615 | Morganson | Nov. 1, 1955 |
| 2,774,922 | Thomas | Dec. 18, 1956 |

FOREIGN PATENTS

| | | |
|---|---|---|
| 305,245 | Switzerland | Apr. 16, 1955 |